US012533697B2

(12) United States Patent
Ma

(10) Patent No.: US 12,533,697 B2
(45) Date of Patent: Jan. 27, 2026

(54) PRESS LIQUID PUMP

(71) Applicant: GUANGZHOU LICHUANG PACKAGING CO., LTD, Guangzhou (CN)

(72) Inventor: Li Ma, Guangzhou (CN)

(73) Assignee: GUANGZHOU LICHUANG PACKAGING CO., LTD, Guangzhou (CN)

( * ) Notice: Subject to any disclaimer, the term of this patent is extended or adjusted under 35 U.S.C. 154(b) by 195 days.

(21) Appl. No.: 18/520,815

(22) Filed: Nov. 28, 2023

(65) Prior Publication Data

US 2025/0170602 A1 May 29, 2025

(51) Int. Cl.
*B05B 11/10* (2023.01)
*B05B 12/00* (2018.01)

(52) U.S. Cl.
CPC ........ *B05B 11/1078* (2023.01); *B05B 12/002* (2013.01)

(58) Field of Classification Search
CPC ............... B05B 11/1078; B05B 12/002; B05B 11/1047; B65D 2583/005; B05C 17/01
See application file for complete search history.

(56) References Cited

U.S. PATENT DOCUMENTS 6,533,482 B1 * 3/2003 Byun ..................... A45D 34/04 401/265
7,467,908 B2 * 12/2008 Francavilla ........... G01F 11/025 222/546
10,040,084 B2 * 8/2018 Duquet ................. G01F 11/027

* cited by examiner

*Primary Examiner* — Donnell A Long
(74) *Attorney, Agent, or Firm* — HOWARD M COHN and Associates, LLC

(57) ABSTRACT

A press liquid pump includes an outer pipe and an inner pipe disposed in the outer pipe. A vacuum pump head is disposed on the outer pipe. A liquid outlet pipe of the vacuum pump head is disposed outside the outer pipe. A pressing portion of the vacuum pump head is disposed in the outer pipe. A first opening is defined in the outer pipe. A first end of the inner pipe is closed, and a second end of the inner pipe defines a second opening. When the inner pipe is disposed in the outer pipe, the inner pipe is inserted into the outer pipe, and the inner pipe is connected with the pressing portion of the vacuum pump head. When the inner pipe is pressed towards the vacuum pump head, liquid in the inner pipe is pumped to an outside of the outer pipe.

9 Claims, 3 Drawing Sheets

PRESS LIQUID PUMP

TECHNICAL FIELD

The present disclosure relates to a technical field of packaging tools, and in particular to a press liquid pump.

BACKGROUND

In fields such as daily cosmetic packaging, food packaging, pharmaceutical packaging, etc., it is necessary to use boxes, bottles, jars, or other isolation, restraint and functional vacuum containers to fill and contain pastes, liquids, lotions, etc. Most of conventional vacuum containers are press-type containers each including a pressure handle, a nozzle, a liquid outlet pipe, a valve core, a glass ball, and other components. The conventional vacuum containers each creates an air difference between an inside and an outside by pressing the pressing handle thereof, so that the paste, the liquid, the lotions, etc. therein is extruded out through the nozzle thereof that is hollow.

In the prior art, the pressing handle and the nozzle of each of the conventional push-type liquid pumps are generally disposed on one component. Such pressing method is convenient, but for some liquids with relatively high hygienic requirements, a user may easily touch the nozzle when pressing the one component, which causes contamination to the liquids, thus affecting use effects of the liquids.

SUMMARY

A purpose of the present disclosure is to provide a press liquid pump to solve a problem in the prior art that it is easy to touch a liquid outlet end disposed close to a push end of a conventional push-type liquid pump to cause contamination of liquid in the conventional push-type liquid pump when a user presses the push end.

To solve the above problem, the present disclosure provides the press liquid pump. The press liquid pump comprises an outer pipe and an inner pipe disposed in the outer pipe.

A vacuum pump head is disposed on a first end of the outer pipe. A liquid outlet pipe of the vacuum pump head is disposed outside the outer pipe. A pressing portion of the vacuum pump head is disposed in the outer pipe. A first opening is defined in a second end of the outer pipe.

A first end of the inner pipe is closed, and a second end of the inner pipe defines a second opening.

When the inner pipe is disposed in the outer pipe, the second end of the inner pipe is inserted into the outer pipe from the first opening of the outer pipe, and the inner pipe is connected with the pressing portion of the vacuum pump head through the second opening defined in the outer pipe. When the inner pipe is pressed towards the vacuum pump head, liquid in the inner pipe is pumped to an outside of the outer pipe through the vacuum pump head.

Furthermore, the vacuum pump head comprises a fixing portion, a main spring, the pressing portion, and the liquid outlet pipe. A first pressing groove is defined on one end of the fixing portion facing the first opening. A first end of the liquid outlet pipe is disposed outside the outer pipe. A second end of the liquid outlet pipe is communicated with the first pressing groove. A first end of the pressing portion is slidably disposed in the first pressing groove. A second pressing groove is defined on the first end of the pressing portion. The first pressing groove is matched with the second pressing groove to form a pumping cavity. A second end of the pressing portion defines a liquid inlet communicated with the second pressing groove.

A first end of the main spring is connected with a groove bottom of the first pressing groove. A second end of the main spring is connected with a groove bottom of the second pressing groove. A first check valve is disposed in the liquid inlet. The first check valve is configured to unidirectionally communicate the liquid inlet to the second pressing groove. A second check valve is disposed in the liquid outlet pipe. The second check valve is configured to unidirectionally communicate the first pressing groove to the liquid outlet pipe.

Furthermore, the first check valve comprises a first ball, a first auxiliary spring, and a first limiting bracket. The first limiting bracket is disposed in the second pressing groove. The first limiting bracket is connected with a groove wall of the second pressing groove. A first gap is defined between the first limiting bracket and the liquid inlet. The first ball is movably disposed in the first gap. A diameter of the first ball is greater than a diameter of the liquid inlet. A first end of the first auxiliary spring is connected with the first limiting bracket. A second end of the first auxiliary spring is connected with the first ball. The first auxiliary spring is configured to push the first ball to seal the liquid inlet.

Furthermore, the liquid outlet pipe is communicated with the groove bottom of the first pressing groove through a one-way cavity. The second check valve is disposed in the one-way cavity.

Furthermore, the second check valve comprises a second ball, a second auxiliary spring, and a second limiting bracket. A first end of the one-way cavity is communicated with the liquid outlet pipe, a second end of the one-way cavity is communicated with the groove bottom of the first pressing groove through a liquid outlet. The second limiting bracket is disposed in the one-way cavity. The second limiting bracket is connected with a cavity wall of the one-way cavity. A second gap is defined between the second limiting bracket and the liquid outlet. The second ball is movably disposed in the second gap. A diameter of the second ball is greater than a diameter of the liquid outlet. A first end of the second auxiliary spring is connected with the second auxiliary bracket, and a second end of the second auxiliary spring is connected with the second ball. The second auxiliary spring is configured to push the second ball to seal the liquid outlet.

Furthermore, a first thread structure is disposed on an inner wall of the second opening. A second thread structured matched with the first thread structure is disposed on an outer wall of the pressing portion. When the inner pipe is connected with the pressing portion, the inner pipe is sleeved on an outer wall of the pressing portion from the second opening, and the first thread structure is screwed with the second thread structure.

Furthermore, a pressing pipe is mounted at the first end of the inner pipe away from the vacuum pump head. One end of the pressing pipe defines a third opening. The pressing pipe is sleeved on an outer wall of the inner pipe from the third opening. A second end of the pressing pipe is disposed outside the outer pipe. A pressing cover is disposed on an outer side of the pressing pipe.

Furthermore, a boss is disposed on the second end of the pressing pipe. The boss is connected with the pressing cover through threads. The pressing pipe comprises air holes running through an inner side and the outer side of the pressing pipe. The air holes are defined on an end portion of the pressing pipe where the boss is connected.

Furthermore, the first end of the outer pipe connected with the vacuum pump head is detachably connected with a pipe cap. The pipe cap is configured to protect the liquid outlet pipe.

Compared with the prior art, a pressing position and a liquid outlet position are respectively disposed on two ends of the outer pipe, so the user will not easily touch the liquid outlet position when pressing the press liquid pump, thereby avoiding contamination of the liquid outlet position due to the user's touch. The inner pipe stores the liquid very well, and by providing the outer pipe, it not only satisfies a pressing function, but also protects the inner pipe well.

Figure 1:
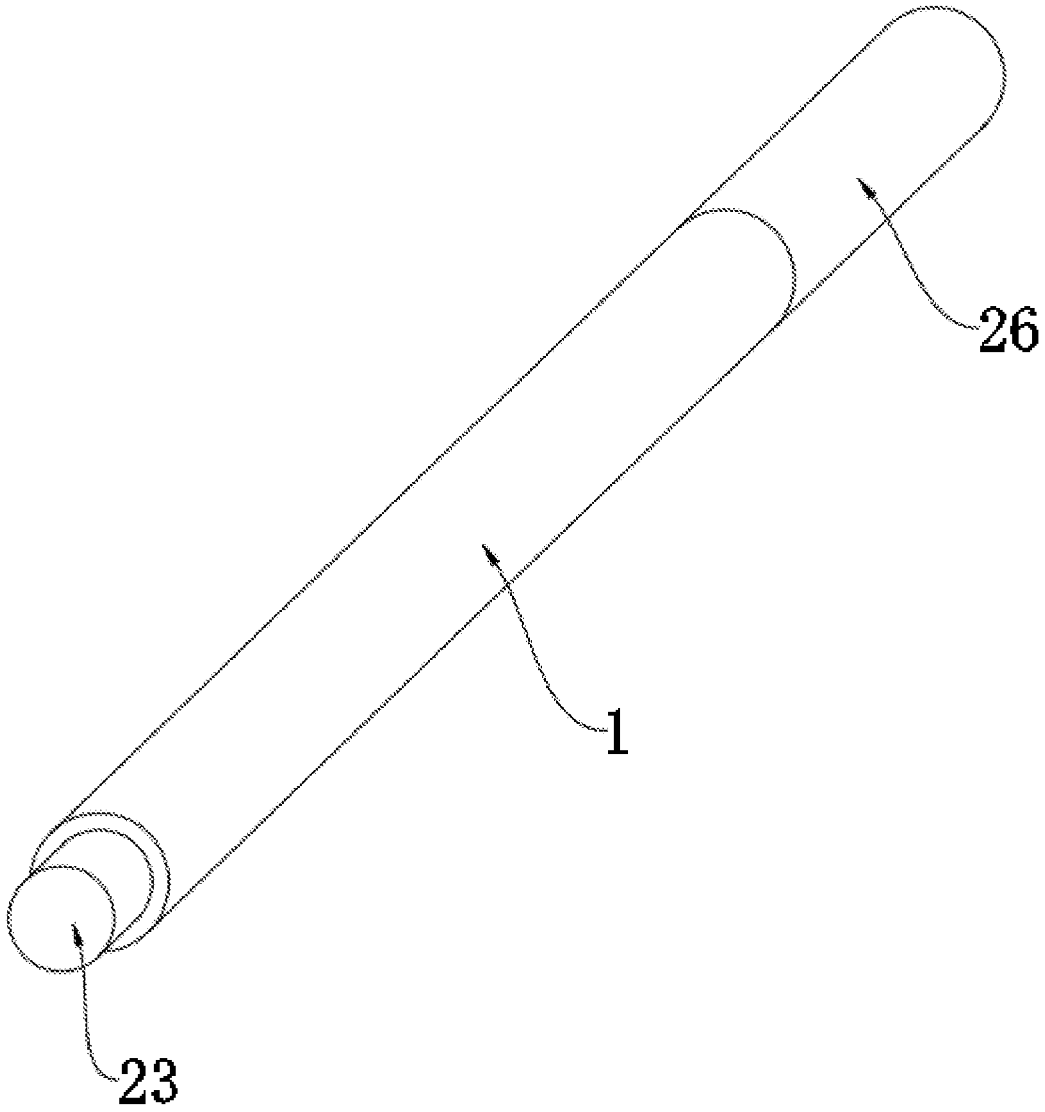
FIG. 1 is a schematic diagram of a press liquid pump of the present disclosure.

In the drawings: 1—outer pipe, 2—inner pipe, 3—vacuum pump head, 4—liquid outlet pipe, 5—pressing portion, 6—first opening, 7—second opening, 8—fixing portion, 9—main spring, 10—first pressing groove, 11—second pressing groove, 12—one-way cavity, 13—first ball; 14—first auxiliary spring; 15—first limiting bracket; 16—one-way cavity; 17—second ball, 18—second auxiliary spring, 19—second limiting bracket, 20—liquid outlet, 21—pressing pipe, 22—third opening, 23—pressing cover, 24—boss, 25—air hole, 26—pipe cap.

DETAILED DESCRIPTION

In order to make objectives, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

Embodiment 1

Figure 2:
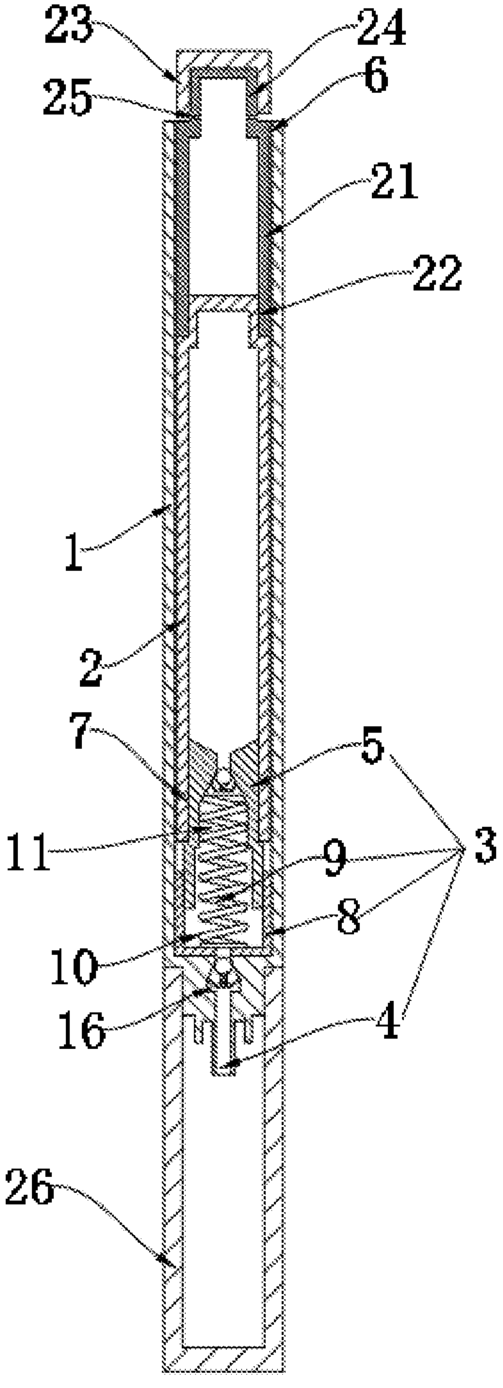
FIG. 2 is a cross-sectional side schematic diagram of the press liquid pump of the present disclosure.

As shown in FIGS. 1 and 2, the present disclosure provides a press liquid pump. The press liquid pump comprises an outer pipe 1, and an inner pipe 2 disposed in the outer pipe 1. A vacuum pump head 3 is disposed on a first end of the outer pipe 1. A liquid outlet pipe 4 of the vacuum pump head 3 is disposed outside of the outer pipe 1. A pressing portion 5 of the vacuum pump head 3 is disposed in the outer pipe 1. A first opening 6 is defined in a second end of the outer pipe 1. A first end of the inner pipe 2 is closed, and a second end of the inner pipe 2 defines a second opening 7. When the inner pipe 2 is disposed in the outer pipe 1, the second end of the inner pipe 2 is inserted into the outer pipe 1 from the first opening 6 of the outer pipe 1, and the inner pipe 2 is connected with the pressing portion 5 of the vacuum pump head 3 through the second opening 7 defined in the outer pipe 1. When the inner pipe 2 is pressed towards the vacuum pump head 3, liquid in the inner pipe 2 is pumped to an outside of the outer pipe 1 through the vacuum pump head 3.

A pressing position and a liquid outlet position are respectively disposed on two ends of the outer pipe, so the user will not easily touch the liquid outlet position when pressing the press liquid pump, thereby avoiding contamination of the liquid outlet position due to the user's touch. The inner pipe stores the liquid very well, and by providing the outer pipe, it not only satisfies a pressing function, but also protects the inner pipe well.

The vacuum pump head 3 comprises a fixing portion 8, a main spring 9, the pressing portion 5, and the liquid outlet pipe 4. A first pressing groove 10 is defined on one end of the fixing portion 8 facing the first opening 6. A first end of the liquid outlet pipe 4 is disposed outside the outer pipe 1. A second end of the liquid outlet pipe 4 is communicated with the first pressing groove 10. A first end of the pressing portion 5 is slidably disposed in the first pressing groove 10. A second pressing groove 11 is defined on the first end of the pressing portion 5. The first pressing groove 10 is matched with the second pressing groove 11 to form a pumping cavity. A second end of the pressing portion 5 defines a liquid inlet 12 communicated with the second pressing groove 11.

A first end of the main spring 9 is connected with a groove bottom of the first pressing groove 10. A second end of the main spring is connected with a groove bottom of the second pressing groove. A first check valve is disposed in the liquid inlet 12. The first check valve is configured to unidirectionally communicate the liquid inlet 12 to the second pressing groove 11. A second check valve is disposed in the liquid outlet pipe 4. The second check valve is configured to unidirectionally communicate the first pressing groove 10 to the liquid outlet pipe 4.

By arrangements of the first check valve and the second check valve, when the inner pipe 2 is pressed towards the vacuum pump head 3, the pressing portion 5 moves towards the fixing portion 8, the main spring 9 is compressed, a space of the pumping cavity is reduced, and air in the pumping cavity is discharged through the second check valve. When the inner pipe 2 is released, the main spring 9 pushes the pressing portion 5 to move away from the fixing portion 8, the liquid in the inner pipe 2 enters the pumping cavity through the first check valve, and the space of the pumping cavity is increased. After reciprocating times of pressing, the liquid in the pumping cavity is discharged through the second check valve, so as to realize discharge of the liquid in the inner pipe 2.

Embodiment 2

Figure 3:
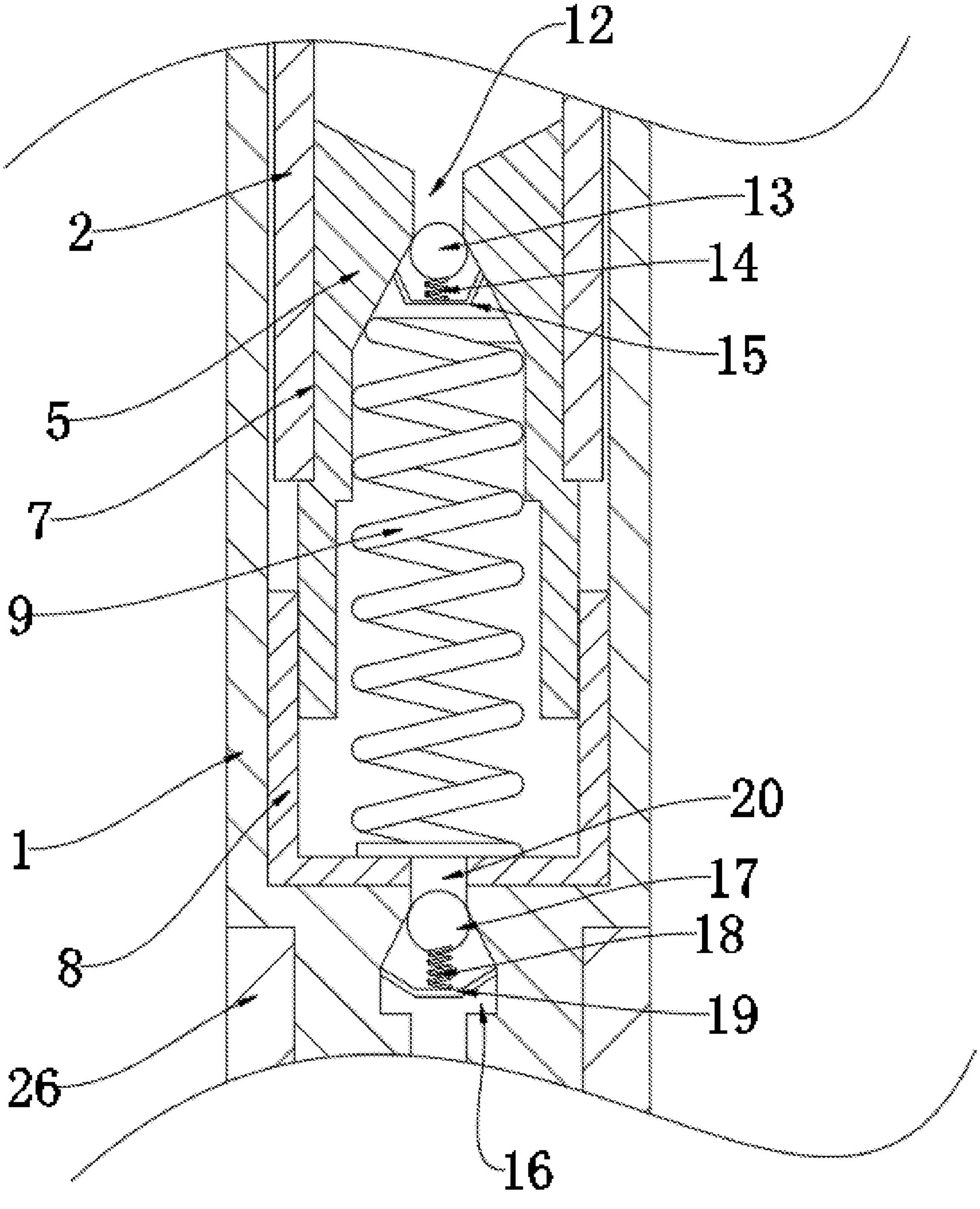
FIG. 3 is a cross-sectional schematic diagram taken from a position of a vacuum pump head of the press liquid pump of the present disclosure.

As shown in FIG. 3, the first check valve comprises a first ball 13, a first auxiliary spring 14, and a first limiting bracket 15. The first limiting bracket 15 is disposed in the second pressing groove 11. The first limiting bracket 15 is connected with a groove wall of the second pressing groove 11. A first gap is defined between the first limiting bracket 15 and the liquid inlet 12. The first ball 13 is movably disposed in the first gap. A diameter of the first ball 13 is greater than a diameter of the liquid inlet 12. A first end of the first auxiliary spring 14 is connected with the first limiting bracket 15. A second end of the first auxiliary spring 14 is connected with the first ball 13. The first auxiliary spring 14 is configured to push the first ball 13 to seal the liquid inlet 12.

When the press liquid pump of the present disclosure is in use, the liquid outlet pipe 4 is in a horizontal state, vertically upward or vertically downward, so in order to ensure that the first check valve works normally in any posture, a structure of the first check valve is well designed. Therefore, under normal conditions, the first ball 13 remains in contact with the liquid inlet 12 to seal the liquid inlet 12 due to thrust of the first auxiliary spring 14, thereby preventing the liquid in the pumping cavity from flowing back into the inner pipe 2 and preventing the liquid in the inner pipe 2 from flowing into the pumping cavity. When the space of the pumping cavity increases, due to the vacuum effect, the liquid in the inner pipe 2 enters the pumping cavity. At this time, the liquid in the inner pipe 2 pushes away the first ball 13, causing the first ball to 13 compresses the first auxiliary spring 14 so that the liquid in the inner pipe 2 normally enters the pumping cavity.

Furthermore, the liquid outlet pipe 4 is communicated with the groove bottom of the first pressing groove 10 through a one-way cavity 16. The second check valve is disposed in the one-way cavity 16.

The second check valve comprises a second ball 17, a second auxiliary spring 18, and a second limiting bracket 19. A first end of the one-way cavity 16 is communicated with the liquid outlet pipe 4, and a second end of the one-way cavity 16 is communicated with the groove bottom of the first pressing groove 10 through a liquid outlet 20. The second limiting bracket 19 is disposed in the one-way cavity 16. The second limiting bracket 19 is connected with a cavity wall of the one-way cavity 16. A second gap is defined between the second limiting bracket 19 and the liquid outlet 20. The second ball 17 is movably disposed in the second gap. A diameter of the second ball 17 is greater than a diameter of the liquid outlet 20. A first end of the second auxiliary spring 18 is connected with the second auxiliary bracket 19, and a second end of the second auxiliary spring 18 is connected with the second ball 17. The second auxiliary spring 18 is configured to push the second ball 17 to seal the liquid outlet 20.

A principle of the second check valve is same a principle of the first check valve. Both of the first check valve and the second check valve are configured to enable the press liquid pump to be used normally in any posture. When the space of the pumping cavity is compressed, since the first ball 13 seals the liquid inlet 12, the liquid in the pumping cavity only pushes the second ball 17, causing the second ball 17 to compress the second auxiliary spring 18, so that the liquid in the pumping cavity is allowed to enter the liquid outlet pipe 4.

Furthermore, a first thread structure is disposed on an inner wall of the second opening 7. A second thread structured matched with the first thread structure is disposed on an outer wall of the pressing portion 5. When the inner pipe 2 is connected with the pressing portion 5, the inner pipe 2 is sleeved on an outer wall of the pressing portion 5 from the second opening 7, and the first thread structure is screwed with the second thread structure. By providing the first thread structure and the second thread structure, during an assembly process, liquid is first injected into the inner pipe 2, and then the inner pipe 2 is assembled with the outer pipe 1 through the first thread structure and the second thread structure.

Furthermore, a pressing pipe 21 is mounted at the first end of the inner pipe 2 away from the vacuum pump head 3. One end of the pressing pipe 21 defines a third opening 22. The pressing pipe 21 is sleeved on an outer wall of the inner pipe 2 from the third opening 22. A second end of the pressing pipe 21 is disposed outside the outer pipe 1. A pressing cover 23 is disposed on an outer side of the pressing pipe 21.

By providing the pressing pipe 21, the inner pipe 2 is prevented from being directly exposed to the outside of the outer pope and the inner pipe 2 is prevented from damage caused by collision, thereby protecting the inner pipe 2.

Furthermore, a boss 24 is disposed on the second end of the pressing pipe 21. The boss 24 is connected with the pressing cover 23 through threads. The pressing pipe 21 comprises air holes 25 running through an inner side and the outer side of the pressing pipe 21. The air holes 25 are defined on an end portion of the pressing pipe 21 where the boss is connected.

The pressing cover 23 improves a comfort of pressing the press liquid pump. When assembling the pressing pipe 21, since the pressing pipe 21 is directly sleeved on the outer side of the inner pipe 2, air in the pressing pipe 21 cannot be discharged normally from the third opening 22 during assembly, causing a pressure inside the pressing pipe 21 to be greater than an outside world pressure and causing assembly instability. By providing the air holes 25, excess air in the pressing pipe 21 is effectively discharged, so that the pressing pipe 21 and the inner pipe 2 are stably installed.

Furthermore, the first end of the outer pipe 1 connected with the vacuum pump head 3 is detachably connected with a pipe cap 26. The pipe cap 26 is configured to protect the liquid outlet pipe 4. By providing the pipe cap 26, the liquid outlet pipe 4 is well protected when the press liquid pump is not in use.

Embodiment 3

The press liquid pump in the embodiment 1 may be used as a packaging bottle for smoking cessation oil, and the smoking cessation oil is stored in the inner pipe 2. When the smoking cessation oil needs to be used, the pressing pipe 21 is pressed to push the inner pipe 2 to move in the outer pipe 1, so that the smoking cessation oil in the inner pipe 2 is injected into a cigarette filter tip through the liquid outlet pipe 4. Since an output of the smoking cessation oil is well controlled every time of pressing, the press liquid pump provided by the present disclosure is convenient to carry and use the smoking cessation oil.

Although the present disclosure are described herein with reference to a plurality of illustrative embodiments of the present disclosure, it should be understood that many other modifications and embodiments may be devised by those skilled in the art, which shall fall within the principles and spirit of the present disclosure. More specifically, various modifications and improvements may be made to the constituent components and/or layouts of the subject combination layout within the scope of the drawings, specification, and claims of the present disclosure. Other uses are also apparent to those skilled in the art in addition to variations and modifications to the constituent components and/or the layouts.

What is claimed is:

1. A press liquid pump, comprising:

an outer pipe, and an inner pipe disposed in the outer pipe;

wherein a vacuum pump head is disposed on a first end of the outer pipe; a liquid outlet pipe of the vacuum pump head is disposed outside of the outer pipe; a pressing portion of the vacuum pump head is disposed in the outer pipe; a first opening is defined in a second end of the outer pipe;

wherein a first end of the inner pipe is closed, and a second end of the inner pipe defines a second opening;

wherein when the inner pipe is disposed in the outer pipe, the second end of the inner pipe is inserted into the outer pipe from the first opening of the outer pipe; the inner pipe is connected with the pressing portion of the vacuum pump head through the second opening; when the inner pipe is pressed towards the vacuum pump head, liquid in the inner pipe is pumped to an outside of the outer pipe through the vacuum pump head.

2. The press liquid pump according to claim 1, wherein the vacuum pump head comprises a fixing portion, a main spring, the pressing portion, and the liquid outlet pipe; a first pressing groove is defined on one end of the fixing portion facing the first opening; a first end of the liquid outlet pipe is disposed outside the outer pipe; a second end of the liquid outlet pipe is communicated with the first pressing groove; a first end of the pressing portion is slidably disposed in the first pressing groove; a second pressing groove is defined on the first end of the pressing portion; the first pressing groove is matched with the second pressing groove to form a pumping cavity; a second end of the pressing portion defines a liquid inlet communicated with the second pressing groove;

wherein a first end of the main spring is connected with a groove bottom of the first pressing groove; a second end of the main spring is connected with a groove bottom of the second pressing groove; a first check valve is disposed in the liquid inlet; the first check valve is configured to unidirectionally communicate the liquid inlet to the second pressing groove; a second check valve is disposed in the liquid outlet pipe; the second check valve is configured to unidirectionally communicate the first pressing groove to the liquid outlet pipe.

3. The press liquid pump according to claim 2, wherein the first check valve comprises a first ball, a first auxiliary spring, and a first limiting bracket; the first limiting bracket is disposed in the second pressing groove; the first limiting bracket is connected with a groove wall of the second pressing groove; a first gap is defined between the first limiting bracket and the liquid inlet; the first ball is movably disposed in the first gap; a diameter of the first ball is greater than a diameter of the liquid inlet; a first end of the first auxiliary spring is connected with the first limiting bracket; a second end of the first auxiliary spring is connected with the first ball; the first auxiliary spring is configured to push the first ball to seal the liquid inlet.

4. The press liquid pump according to claim 2, wherein the liquid outlet pipe is communicated with the groove bottom of the first pressing groove through a one-way cavity; the second check valve is disposed in the one-way cavity.

5. The press liquid pump according to claim 4, wherein the second check valve comprises a second ball, a second auxiliary spring, and a second limiting bracket; a first end of the one-way cavity is communicated with the liquid outlet pipe, a second end of the one-way cavity is communicated with the groove bottom of the first pressing groove through a liquid outlet; the second limiting bracket is disposed in the one-way cavity; the second limiting bracket is connected with a cavity wall of the one-way cavity; a second gap is defined between the second limiting bracket and the liquid outlet; the second ball is movably disposed in the second gap; a diameter of the second ball is greater than a diameter of the liquid outlet; a first end of the second auxiliary spring is connected with the second auxiliary bracket, and a second end of the second auxiliary spring is connected with the second ball; the second auxiliary spring is configured to push the second ball to seal the liquid outlet.

6. The press liquid pump according to claim 1, wherein a first thread structure is disposed on an inner wall of the second opening; a second thread structure matched with the first thread structure is disposed on an outer wall of the pressing portion; when the inner pipe is connected with the pressing portion, the inner pipe is sleeved on an outer wall of the pressing portion from the second opening, and the first thread structure is screwed with the second thread structure.

7. The press liquid pump according to claim 1, wherein a pressing pipe is mounted at the first end of the inner pipe away from the vacuum pump head; one end of the pressing pipe defines a third opening; the pressing pipe is sleeved on an outer wall of the inner pipe from the third opening; a second end of the pressing pipe is disposed outside the outer pipe;

a pressing cover is disposed on an outer side of the pressing pipe.

8. The press liquid pump according to claim 7, wherein a boss is disposed on the second end of the pressing pipe; the boss is connected with the pressing cover through threads;

the pressing pipe comprises air holes running through an inner side and the outer side of the pressing pipe; the air holes are defined on an end portion of the pressing pipe where the boss is connected.

9. The press liquid pump according to claim 1, wherein the first end of the outer pipe connected with the vacuum pump head is detachably connected with a pipe cap; the pipe cap is configured to protect the liquid outlet pipe.

* * * * *